No. 723,523. PATENTED MAR. 24, 1903.
P. H. GARRITY.
SCREW DRIVER OR KINDRED TOOL.
APPLICATION FILED AUG. 11, 1902.
NO MODEL.
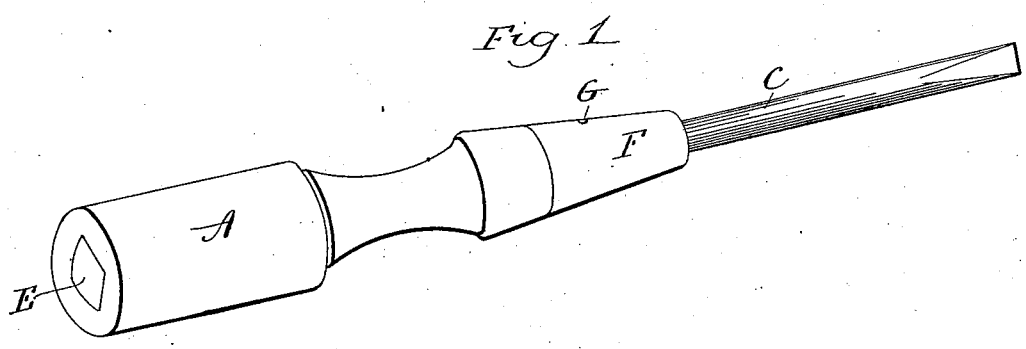
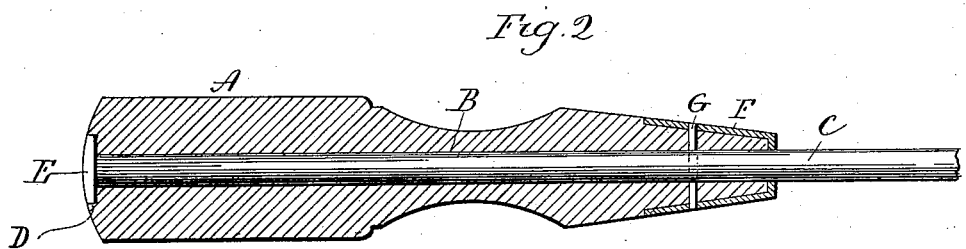
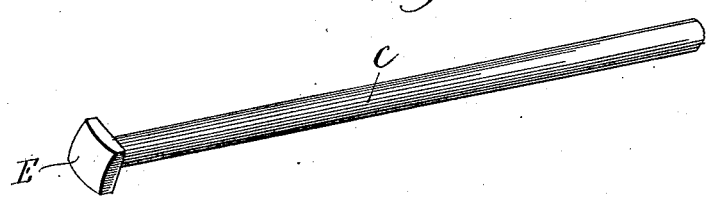

United States Patent Office.

PATRICK H. GARRITY, OF WATERBURY, CONNECTICUT.

SCREW-DRIVER OR KINDRED TOOL.

SPECIFICATION forming part of Letters Patent No. 723,523, dated March 24, 1903.

Application filed August 11, 1902. Serial No. 119,153. (No model.)

*To all whom it may concern:*

Be it known that I, PATRICK H. GARRITY, of Waterbury, in the county of New Haven and State of Connecticut, have invented a new and useful Improvement in Screw-Drivers or Kindred Tools; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a screw-driver or kindred tool constructed in accordance with my invention; Fig. 2, a longitudinal sectional view of the same; Fig. 3, a perspective view of the shank of the tool detached.

This invention relates to an improvement in screw-drivers and kindred tools—such as screw-drivers, &c.—and particularly to that class in which the shank of the tool extends entirely through the handle and so as to be exposed at the outer end, the object of the invention being the simple construction of a shank which is not liable to cause the handle to split and one which will permit of being struck, as with a hammer; and the invention consists in the construction as hereinafter described, and particularly recited in the claim.

As herein shown, the handle A may be of any approved design, formed with a longitudinal hole B, corresponding in diameter to the diameter of the shank C of a screw-driver or other similar tool. In the outer end of the handle is an angular recess D, and the outer end of the shank is formed with a head E, to which the recess D conforms and so that the head E may be set into the handle flush with the outer end thereof. The inner end of the handle is provided with the usual ferrule F. If desired, and preferably, a pin G will be employed which passes through the ferrule and through the shank of the tool, so as to hold it in engagement with the handle. As herein shown, the head of the shank is substantially square, and this is the preferred shape, as the shank is readily formed with a square head.

As usual in assembling tools of this class, the shank is driven into the handle from its outer end inward and so that the head will be seated in the recess in the outer end of the handle. After the handle is applied the end of the tool may be flattened or otherwise formed as required, or a tool-point may be welded to the shank.

It will be understood from the foregoing that I am aware that handles for screw-drivers and kindred tools have been provided with longitudinal holes through which the shanks extend, that the outer ends of tool-shanks have been made polygonal, and also that shanks have been provided with wings at their outer ends and the handles with slots into which the said wings extend, and that shanks have been formed with heads to inclose the outer end of the handle, and therefore do not wish to be understood as claiming such as my invention.

Having fully described my invention, what I claim as new, and desire to secure by Letters Patent, is—

The herein-described screw-driver and kindred tool, comprising a shank having a substantially flat, square head at its outer end, and a handle having a longitudinal hole through which the shank extends, said handle formed with a hollow square recess in its outer end corresponding in shape to the shape of the head, and in depth corresponding to the thickness of said head which it receives, and so that the outer face of the head will stand flush with the outer end of the handle, substantially as described.

In testimony whereof I have signed this specification in the presence of two subscribing witnesses.

PATRICK H. GARRITY.

Witnesses:
D. H. TIERNEY,
GEO. WALTERS.